(12) United States Patent
Yung et al.

(10) Patent No.: US 7,215,954 B1
(45) Date of Patent: May 8, 2007

(54) RESOURCE ALLOCATION METHOD FOR MULTI-PLATFORM COMMUNICATION SYSTEM

(75) Inventors: Kar W. Yung, Torrance, CA (US); Frank A. Hagen, Palos Verdes Estates, CA (US); Donald C. D. Chang, Thousand Oaks, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 1232 days.

(21) Appl. No.: 09/587,960

(22) Filed: Jun. 6, 2000

Related U.S. Application Data

(63) Continuation-in-part of application No. 09/271,997, filed on Mar. 18, 1999, now Pat. No. 6,337,980.

(51) Int. Cl.
*H04Q 7/20* (2006.01)

(52) U.S. Cl. .................. 455/430; 455/429; 455/427; 455/12.1; 370/316; 370/310

(58) Field of Classification Search ............. 370/310, 370/315, 316, 320, 350, 308, 579, 335, 342; 455/12.1, 13.1, 132, 430, 429, 427
See application file for complete search history.

(56) References Cited

U.S. PATENT DOCUMENTS

| | | | |
|---|---|---|---|
| 2,470,787 A | 5/1949 | Nosker | 342/12 |
| 3,384,891 A | 5/1968 | Anderson | 343/100 |
| 3,541,553 A | 11/1970 | Gubin | |
| 3,544,995 A | 12/1970 | Bottenberg et al. | 342/46 |
| 3,720,953 A | 3/1973 | Ajioka | 343/771 |
| 4,161,730 A | 7/1979 | Anderson | 342/352 |
| 4,161,734 A | 7/1979 | Anderson | 342/352 |
| 4,359,733 A | 11/1982 | O'Neill | 343/6.5 |
| 4,613,864 A | 9/1986 | Hofgen | 343/357 |
| 4,635,063 A | 1/1987 | Chang et al. | 342/380 |
| 4,758,959 A | 7/1988 | Thoone et al. | |
| 4,819,227 A | 4/1989 | Rosen | 370/75 |
| 4,897,661 A | 1/1990 | Hiraiwa | 342/457 |
| 4,979,170 A | 12/1990 | Gilhousen et al. | 370/104.1 |
| 4,994,806 A | 2/1991 | Yung | 342/108 |
| 5,006,855 A | 4/1991 | Braff | 342/357 |
| 5,010,330 A | 4/1991 | Snowden et al. | |
| 5,017,927 A | 5/1991 | Agrawal et al. | 342/371 |
| 5,077,562 A | 12/1991 | Chang et al. | 342/368 |

(Continued)

FOREIGN PATENT DOCUMENTS

EP 0 335 558 4/1989

(Continued)

OTHER PUBLICATIONS

U.S. patent application Ser. No. 09/576,652, Hagen et al., filed May 22, 2000.

(Continued)

*Primary Examiner*—Danh C. Lee
(74) *Attorney, Agent, or Firm*—Georgann S. Grunebach

(57) ABSTRACT

A mobile wireless communications system including a plurality of individual transponding nodes of various types, all in communication with a central processing hub. A local user signal is processed by the central processing hub and radiated through multiple paths to a plurality of the plurality of individual transponding platforms simultaneously. The signal is then re-radiated by each of the plurality of the plurality of individual transponding platforms to a mobile terminal that receives the re-radiated signal from the plurality of the plurality of individual transponding platforms coherently and in phase. The number of transponders and codes used to transmit each user signal can be readily adapted to user requirements. Additionally, each user is assigned a profit value by the central processing hub depending upon certain user characteristics. The assigned user profit value allows the total system utility/profitability to be maximized.

43 Claims, 6 Drawing Sheets

U.S. PATENT DOCUMENTS

| | | | |
|---|---|---|---|
| 5,099,245 A | 3/1992 | Sagey | 342/357 |
| 5,111,209 A | 5/1992 | Toriyama | 342/357 |
| 5,126,748 A | 6/1992 | Ames et al. | 342/353 |
| 5,218,619 A | 6/1993 | Dent | 375/1 |
| 5,233,626 A | 8/1993 | Ames | 375/1 |
| 5,278,863 A | 1/1994 | Briskman | 375/1 |
| 5,319,673 A | 6/1994 | Briskman | 375/1 |
| 5,327,455 A | 7/1994 | De Gaudenzi et al. | |
| 5,365,447 A | 11/1994 | Dennis | |
| 5,379,320 A | 1/1995 | Fernandes et al. | |
| 5,387,916 A | 2/1995 | Cohn | 342/44 |
| 5,410,314 A | 4/1995 | Frush et al. | 342/26 |
| 5,423,059 A | 6/1995 | LoGalbo et al. | |
| 5,444,450 A | 8/1995 | Olds et al. | 342/357 |
| 5,467,282 A * | 11/1995 | Dennis | 701/215 |
| 5,485,485 A | 1/1996 | Briskman et al. | 375/200 |
| 5,525,995 A | 6/1996 | Benner | 342/90 |
| 5,550,809 A | 8/1996 | Bottomley et al. | 370/18 |
| 5,552,798 A | 9/1996 | Dietrich et al. | |
| 5,555,257 A | 9/1996 | Dent | 370/95.1 |
| 5,572,216 A | 11/1996 | Weinberg et al. | 342/357 |
| 5,589,834 A | 12/1996 | Weinberg | |
| 5,592,471 A | 1/1997 | Briskman | 455/52.3 |
| 5,594,941 A | 1/1997 | Dent | 455/13.4 |
| 5,612,701 A | 3/1997 | Diekelman | 342/354 |
| 5,644,572 A | 7/1997 | Olds et al. | 370/324 |
| 5,736,959 A * | 4/1998 | Patterson et al. | 342/354 |
| 5,739,785 A | 4/1998 | Allison et al. | 342/357 |
| 5,740,549 A | 4/1998 | Reilly et al. | |
| 5,764,187 A | 6/1998 | Rudish et al. | |
| 5,764,188 A | 6/1998 | Ghosh et al. | |
| 5,790,070 A | 8/1998 | Natarajan et al. | 342/354 |
| 5,810,284 A | 9/1998 | Hibbs et al. | 244/13 |
| 5,839,053 A | 11/1998 | Bosch et al. | |
| 5,856,804 A | 1/1999 | Turcotte et al. | 342/371 |
| 5,864,579 A | 1/1999 | Briskman | 375/200 |
| 5,867,109 A | 2/1999 | Wiedeman | 340/827 |
| 5,878,034 A | 3/1999 | Hershey et al. | |
| 5,895,471 A | 4/1999 | King et al. | |
| 5,898,902 A * | 4/1999 | Tuzov | 455/13.1 |
| 5,903,549 A | 5/1999 | von der Embse et al. | 370/310 |
| 5,905,719 A | 5/1999 | Arnold et al. | |
| 5,907,813 A | 5/1999 | Johnson, Jr. et al. | |
| 5,907,816 A | 5/1999 | Newman et al. | |
| 5,909,460 A | 6/1999 | Dent | 375/200 |
| 5,917,447 A | 6/1999 | Wang et al. | 342/383 |
| 5,918,157 A | 6/1999 | Wiedeman et al. | |
| 5,920,284 A | 7/1999 | Victor | 342/357.01 |
| 5,926,104 A | 7/1999 | Robinson | |
| 5,936,548 A | 8/1999 | Takatsuka | |
| 5,944,770 A | 8/1999 | Enge et al. | 701/707 |
| 5,945,948 A | 8/1999 | Buford et al. | 342/457 |
| 5,946,625 A | 8/1999 | Hassan et al. | |
| 5,949,326 A | 9/1999 | Wicks et al. | |
| 5,949,766 A | 9/1999 | Ibanez-Meier et al. | |
| 5,956,619 A | 9/1999 | Gallagher et al. | |
| 5,963,175 A | 10/1999 | Burr | |
| 5,966,371 A | 10/1999 | Sherman | |
| 5,969,674 A | 10/1999 | von der Embse et al. | 342/357.16 |
| 5,973,647 A | 10/1999 | Barrett et al. | 343/713 |
| 5,974,039 A | 10/1999 | Schilling | |
| 5,990,928 A | 11/1999 | Sklar et al. | |
| 5,991,760 A | 11/1999 | Gauvin et al. | |
| 6,002,935 A | 12/1999 | Wang | |
| 6,014,560 A | 1/2000 | Kramer | |
| 6,020,845 A | 2/2000 | Weinberg et al. | |
| 6,028,884 A * | 2/2000 | Silberger et al. | 375/200 |
| 6,061,562 A | 5/2000 | Martin et al. | |
| 6,084,510 A * | 7/2000 | Lemelson et al. | 340/539 |
| 6,104,911 A | 8/2000 | Diekelman | |
| 6,105,060 A | 8/2000 | Rothblatt | |
| 6,111,542 A | 8/2000 | Day et al. | 342/359 |
| 6,118,824 A | 9/2000 | Smith et al. | |
| 6,119,016 A | 9/2000 | Matusevich | |
| 6,138,012 A | 10/2000 | Krutz et al. | 455/427 |
| 6,147,658 A | 11/2000 | Higashi et al. | 343/853 |
| 6,150,977 A | 11/2000 | Wilcoxson et al. | |
| 6,151,308 A | 11/2000 | Ibanez-Meier et al. | |
| 6,151,496 A | 11/2000 | Richards et al. | |
| 6,167,263 A | 12/2000 | Campbell | |
| 6,195,555 B1 | 2/2001 | Dent | |
| 6,205,320 B1 * | 3/2001 | Coleman | 455/13.1 |
| 6,208,626 B1 | 3/2001 | Brewer | |
| 6,208,858 B1 | 3/2001 | Antonio et al. | |
| 6,215,776 B1 | 4/2001 | Chao | |
| 6,229,477 B1 | 5/2001 | Chang et al. | |
| 6,233,456 B1 * | 5/2001 | Schiff et al. | 455/439 |
| 6,236,834 B1 | 5/2001 | Poskett et al. | |
| 6,240,072 B1 | 5/2001 | Lo et al. | |
| 6,243,587 B1 | 6/2001 | Dent et al. | |
| 6,246,363 B1 | 6/2001 | Yung et al. | |
| 6,249,668 B1 | 6/2001 | Abe et al. | |
| 6,266,533 B1 | 7/2001 | Zadeh et al. | |
| 6,275,479 B1 * | 8/2001 | Snell et al. | 370/318 |
| 6,289,211 B1 | 9/2001 | Koorapaty et al. | |
| 6,295,440 B2 | 9/2001 | Chang et al. | |
| 6,298,238 B1 * | 10/2001 | Dai | 455/456 |
| 6,301,231 B1 | 10/2001 | Hassan et al. | |
| 6,313,790 B2 | 11/2001 | Chang et al. | |
| 6,314,269 B1 * | 11/2001 | Hart et al. | 455/12.1 |
| 6,317,420 B1 | 11/2001 | Schiff | |
| 6,324,398 B1 | 11/2001 | Lanzerotti et al. | |
| 6,337,980 B1 | 1/2002 | Chang et al. | |
| 6,339,611 B1 | 1/2002 | Antonio et al. | |
| 6,339,708 B1 | 1/2002 | Wang | |
| 6,340,947 B1 | 1/2002 | Chang et al. | |
| 6,366,761 B1 | 4/2002 | Montpetit | |
| 6,374,080 B2 | 4/2002 | Uchida | |
| 6,377,208 B2 | 4/2002 | Chang et al. | |
| 6,380,893 B1 | 4/2002 | Chang et al. | |
| 6,381,228 B1 * | 4/2002 | Prieto, Jr. et al. | 370/323 |
| 6,388,615 B1 | 5/2002 | Chang et al. | |
| 6,396,819 B1 * | 5/2002 | Fleeter et al. | 370/320 |
| 6,434,384 B1 | 8/2002 | Norin et al. | |
| 6,456,846 B2 | 9/2002 | Norin et al. | |
| 6,507,314 B2 | 1/2003 | Chang et al. | |
| 6,563,457 B2 | 5/2003 | Chang et al. | |
| 6,587,687 B1 * | 7/2003 | Wiedeman | 455/428 |
| 6,707,800 B1 * | 3/2004 | Peyrovian et al. | 370/310.1 |
| 2001/0000167 A1 | 4/2001 | Chang et al. | |
| 2001/0045903 A1 | 11/2001 | Chang et al. | |
| 2002/0006795 A1 | 1/2002 | Norin | |
| 2002/0053987 A1 | 5/2002 | Chang et al. | |
| 2002/0072361 A1 | 6/2002 | Knoblach et al. | |
| 2002/0107034 A1 | 8/2002 | Chang et al. | |
| 2002/0126042 A1 | 9/2002 | Chang et al. | |
| 2002/0129045 A1 | 9/2002 | Chang et al. | |

FOREIGN PATENT DOCUMENTS

| | | |
|---|---|---|
| EP | 0682 416 A | 11/1995 |
| EP | 0749 252 A2 | 12/1996 |
| EP | 0789 252 A2 | 12/1996 |
| EP | 0 776 099 A2 | 5/1997 |
| EP | 0837 568 A2 | 4/1998 |
| EP | 0837 588 A2 | 4/1998 |
| EP | 0 845 874 A2 | 6/1998 |
| EP | 0 860 708 A | 8/1998 |
| EP | 0 860 709 A2 | 8/1998 |
| EP | 0 860 710 A2 | 8/1998 |
| EP | 0 860 952 A2 | 8/1998 |

| | | |
|---|---|---|
| EP | 1 010 988 A2 | 6/2000 |
| EP | 1 037 403 A2 | 9/2000 |
| EP | 1 139 583 A2 | 10/2001 |
| EP | 1 148 662 A2 | 10/2001 |
| EP | 1 158 698 A2 | 11/2001 |
| GB | 2 271 902 A | 10/1993 |
| GB | 2 306 827 A | 5/1997 |
| GB | 2 349 045 | 10/2000 |
| JP | 3-291584 | 12/1991 |
| JP | 07146995 A | 6/1995 |
| JP | 08015405 A | 1/1996 |
| JP | 09026328 | 1/1997 |
| JP | 09113600 A | 5/1997 |
| JP | 2-28580 | 9/1997 |
| JP | 10090391 A | 4/1998 |
| JP | 10-209939 | 8/1998 |
| JP | 11-8579 | 1/1999 |
| JP | 4-27887 | 5/1999 |
| WO | WO 90/13186 | 11/1990 |
| WO | WO 95/04407 | 2/1995 |
| WO | WO 96/22661 | 7/1996 |
| WO | WO 98/51568 | 11/1998 |
| WO | WO 98/51668 | 11/1998 |
| WO | WO 99/13598 | 3/1999 |
| WO | WO 99/23769 | 5/1999 |
| WO | WO 01/91310 A3 | 11/2001 |
| WO | WO 01/93458 A2 | 12/2001 |
| WO | WO 01/94969 A2 | 12/2001 |

OTHER PUBLICATIONS

U.S. patent application Ser. No. 09/584,012, Chang et al., filed May 30, 2000.

U.S. patent application Ser. No. 09/576,648, Yung et al., filed May 22, 2000.

U.S. patent application Ser. No. 09/644,225, Hagen et al., filed Aug. 21, 2000.

U.S. patent application Ser. No. 09/587,759, Yung et al., filed Jun. 6, 2000.

U.S. patent application Ser. No. 09/271,997, Chang et al., filed Mar. 18, 1999.

U.S. patent application Ser. No. 09/209,062, Yung et al., filed Dec. 10, 1998.

U.S. patent application Ser. No. 09/550,505, Chang et al., filed Apr. 17, 2000.

U.S. patent application Ser. No. 08/803,937, Chang et al., filed Feb. 21, 1997.

U.S. patent application Ser. No. 09/669,095, Yung et al., filed Sep. 25, 2000.

U.S. patent application Ser. No. 09/655,498, Chang et al., filed Sep. 5, 2000.

Suzuki, R. et. al, :Mobile TDM/TDMA System With Active Array Antenna, Global Telecommunications Conference, 1991; Globecom '91, vol. 3, Dec. 2–5, 1991, pp. 1569–1573.

Chiba, Isamu et. al, "Digital Beam Forming (DBF) Antenna System for Mobile Communications", IEEE AES Systems Magazine, Sep. 1997, pp. 31–41.

Miura, Ryu et. al, "A DBF Self–Beam Steering Array Antenna for Mobile Satellite Applications Using Beam–Space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073–1076.

Sakakibara, Kunio et. al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

K. K. Chan, F. Marcoux, M. Forest, L. Martins–Camelo, "A Circularly Polarized Waveguide Array For Leo Satellite Communications", pp. 154–157, IEEE1999 AP–S International Symposium, Jun. 1999.

M. Oodo, R. Miura, Y. Hase, "Onboard DBF Antenna For Stratospheric Platform", pp. 125–128, IEEE Conference on Phased Array Systems and Technology, California, May 21–25, 2000.

Yokosuka Research Park, "The First Stratospheric Platform Systems Workshop", pp 1–216, May 12–13, 1999.

Colella, Nicholas J. et al., "The HALO Network™", IEEE Communications Magazine, Jun. 2000, pp. 142–148.

H.D. Griffiths et al., "Bistatic Radar Using Satellite–Borne Illuminators Of Opportunity", IEEE, Radar 92, International Conference, Brighton, UK, 1992, pp. 276–279.

Collella, Nicholas J. et al., "High Speed Internet Access via Stratospheric HALO Aircraft", INET 99 Proceedings, Internet Society, Technology, Wireless, 13 pages, Jun. 8, 1999.

U.S. Appl. No. 09/841,110, filed Apr. 24, 2001, Yung et al.

Teles J et al.: "Overview of TDRSS" Orbit Determination and Analysis. PSD Meeting, Cooper Technical Panel on Satellite Dynamics, $13^{th}$ Cosper Scientific Assembly, Hamburg, Germany, Jul. 11–21, 1994, Advances in Space Research, pp. 67–76.

Bricker, P et al.: "Integrated Receiver for NASA Tracking and Data Relay Satellite System", MILCOM 90. A new Era, 1990 IEEE Military Communications COnference, Monterey, CA, USA, Sep. 30 –Oct. 3, 1990, p. 1–5.

Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp. 262–301.

K. H. Bethke, "A Novel Noncooperative Near–Range Radar Network or Traffic Guidance and Control on Airport Surfaces", IEEE Transactions on Control Systems Technology, vol. 1, No. 3, Sep. 1993.

Doc 9524 FANS/4–WP/76, International Civil Aviation Organization, Special Committee on Future Air Navigation Systems, Fourth Meeting, Montreal, May 2–20 1988, Report, pp. 3.2B–2 & 3.2B–3.

\* cited by examiner

RESOURCE ALLOCATION METHOD FOR MULTI-PLATFORM COMMUNICATION SYSTEM

CROSS-REFERENCE TO RELATED APPLICATIONS

The present application is a continuation-in-part of assignee's co-pending U.S. Ser. No. 09/271,997, entitled "Multiple Satellite Mobile Communications Method and Apparatus for Hand-Held Terminals," filed on Mar. 18, 1999.

TECHNICAL FIELD

The present invention relates generally to a wireless communication system. More specifically, the present invention relates to a resource allocation technique for a multi-platform wireless communication system that provides improved utilization of total system resources to achieve maximum system utility.

BACKGROUND ART

Current mobile satellite communication systems, such as Iridium, Globalstar, and ICO, utilize low-cost user terminals as one of their key system features. To maintain communications linkage with these current mobile systems, the system satellites provide multiple beam and high-gain services to the subscribers. The low-cost and low-gain hand-held terminals utilized by the users of these systems, transmit and receive signals to and from high performance satellites which populate almost the entire hemisphere. Some of these current systems require access to at least two satellites to assure a soft hand-over process as the satellites progress from horizon to horizon. As a result, the satellite system becomes more reliable and available as more satellites come into a user's field of view (FOV). The satellite constellations provided by these current systems are thus sized to guarantee a minimum number of satellites within a user's FOV over large coverage areas at all times.

All of these current mobile satellite communication systems, however, suffer from certain disadvantages. First, they all have limited frequency (the term "frequency" is generalized herein to refer to frequency, time slot or CDMA code) resources. Any given frequency over a given ground position can only be utilized by one user at a time. Thus, if one user accesses a satellite using a particular frequency slot to communicate to his counterpart on network, other satellites and/or users in the same region cannot reuse the same frequency resource in the same local area. In particular, if a nearby secondary user has a handset that requires the same frequency resources as is being utilized by the first user, the second user is unable to access the system, even via different satellites. This is true regardless of the sophistication of the system, including systems that utilize multiple beam satellite designs. Even when multiple satellites are available at a given geographic location, the same frequency spectrum cannot be used by more than one user in a local area. The availability of multiple satellites merely serves to increase the availability of the system to the user. However, the total capacity of these mobile communication satellite systems is still limited by their inefficient usage of the available frequency resources. Thus, the potential growth of these current satellite communication systems is inherently limited.

Additionally, current telecommunications systems generally allow only mobile-to-hub and hub-to-mobile communications in most low earth orbit and medium earth orbit mobile satellite constellations. Mobile-to-mobile linkages require multiple hops between hubs. This means that two or more frequency resources must be committed by the system to close the links.

It is clearly desirable to provide a mobile communication satellite system that relaxes the above constraints, and more efficiently utilizes current mobile satellite communication system resources, while also providing much greater opportunity for system growth.

SUMMARY OF THE INVENTION

It is an object of the present invention to provide a wireless communication system with reduced limitations on frequency re-use for point-to-point communications.

It is another object of the present invention to provide a wireless communication system that utilizes individual transponders and mobile terminals that are relatively simple and of low complexity.

It is a further object of the present invention to provide a wireless communication system with high system reliability through graceful degradation.

It is still another object of the present invention to provide a multi-transponder wireless communication system that allows flexible combination of user types.

It is a related object of the present invention to provide a multi-transponder wireless communication system with better utilization of total system resources.

It is yet a further object of the present invention to provide a resource allocation technique for a multi-platform system that maximizes the total monetary return.

In accordance with the above and other objects of the present invention, a multi-platform wireless communication system is provided. The wireless communication system includes a plurality of individual communication transponding nodes. The plurality of individual transponding nodes are each in communication with a ground hub such that a signal processed by the ground hub in the forward link is radiated with compensating time delays to one or more of the plurality of individual transponders. The radiated signals are then re-radiated by the plurality of individual transponders and coherently received and processed by a mobile user terminal. The return link signal path is the reverse of the forward link.

In accordance with another object of the present invention, the system includes a plurality of individual transponding nodes. The system also includes a plurality of individual resource cells, each associated with a particular one of the plurality of individual transponding nodes and a particular one of the plurality of available codes. The system further includes a plurality of mobile terminals of different types, each of which is assigned to operate in one or more of the plurality of individual resource cells. Each of the plurality of mobile terminals is assigned a profit value. A central hub establishes a link with one or more of the plurality of mobile terminals and assigns one or more resource cells and also assigns a profit value to each of the plurality of mobile terminals.

These and other features of the present invention will become apparent from the following description of the invention, when viewed in accordance with the accompanying drawings and appended claims.

BEST MODE(S) FOR CARRYING OUT THE INVENTION

Referring now to the figures, the disclosed mobile communication system can be utilized to break away from the frequency spectrum limitation discussed above and provide much more efficient means to re-use the allocated mobile satellite and wireless spectrum multiple times. By eliminating this frequency spectrum limitation on the operation of multiple satellites, the overall capacity of existing mobile satellite and wireless communication systems can more readily expand.

Figure 1:
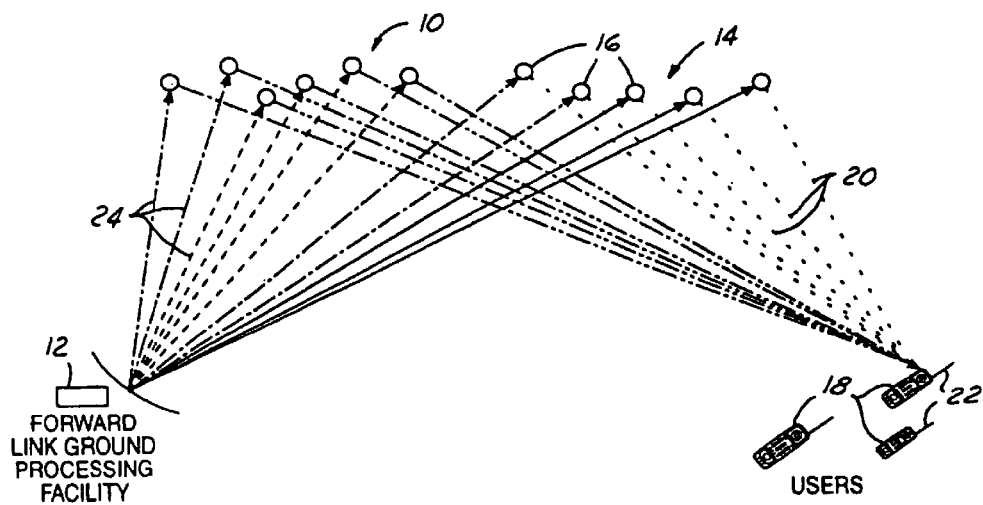
FIG. 1 is a schematic illustration of the forward link geometry of a mobile satellite communications system in accordance with the present invention.

Referring now to FIG. 1, a mobile satellite communication system 10 in accordance with a preferred embodiment of the present invention is illustrated. In FIG. 1, the mobile satellite communications system 10 is illustrated in a forward link mode. The mobile satellite communications system 10 includes a ground telecommunications hub 12, a satellite constellation 14 including a plurality of individual satellites 16, and a plurality of hand-held user terminals 18 such as mobile phones. As discussed in more detail below, the user terminals 18 can receive signals 20 simultaneously from multiple satellites 16 via their broad beam antennas 22. The ground telecommunications hub 12 is in communication with all of the satellites 16 in the satellite constellation 14 individually and simultaneously. The hub 12 also pre-processes user signals to compensate for path differentials before sending radiated signals 24 to the satellites 16, as discussed in more detail below.

In accordance with the preferred embodiment, the design of the individual satellites 14 can be significantly simplified over those utilized in prior mobile systems because the satellite constellation 14 functions as a sparse radiating array. It is known that the more satellites 16 that are included in a satellite constellation 14, the better the performance the mobile satellite communications system 10 will achieve. Satellites that are simple, small, and provide high performance are preferable. This is because the performance of the system 10 depends more heavily on the satellite constellation 14 than on the individual satellites 16.

In a transmit mode, shown in FIG. 1, the individual satellites 16 radiate modulated RF power to a chosen field of view ("FOV"). The system 10 is still operable with reduced capacity and no reconfiguration even if one individual satellite 16 is lost for any reason. As a result, the system 10 features graceful degradation characteristics and provides very high reliability and availability. Most of the complexity of the system 10 is located in the ground hubs 12, which locate and track the potential users and perform the major functions of beamforming and filtering, as discussed below.

Figure 2:
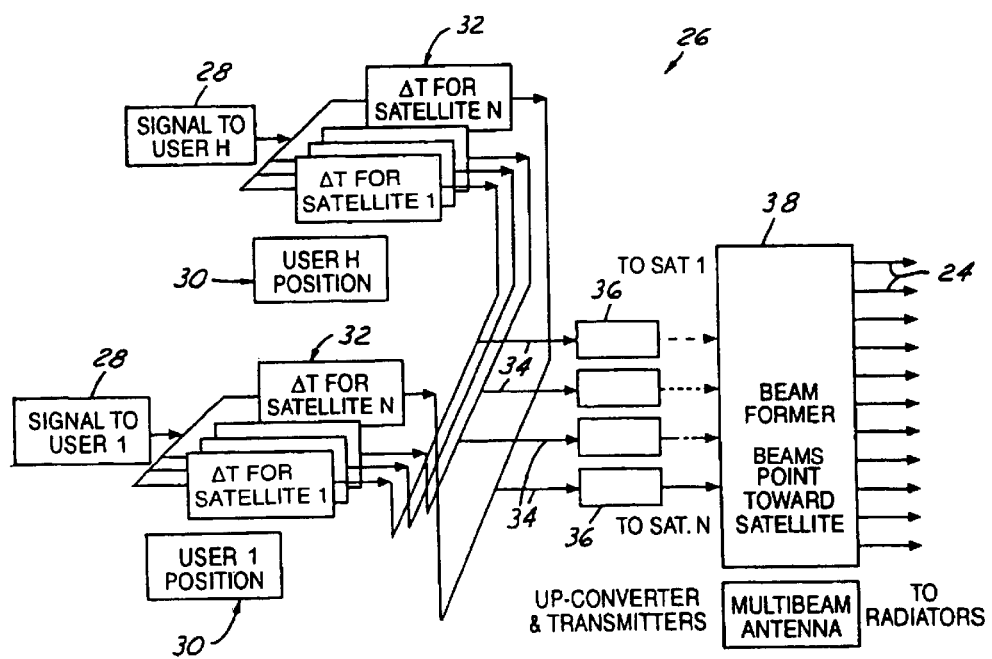
FIG. 2 is a schematic block diagram illustrating the signal transmission function of a ground telecommunications hub for a wireless communications system in accordance with a preferred embodiment of the present invention.

As shown in FIG. 2, the processing performed at the ground telecommunications hub 12 is diagrammatically illustrated. The hub 12 tracks, updates, and forward predicts the time variant differential information among various paths between the hub 12 and the intended user terminals 18. The accuracy of this information must be within a tenth of an RF wavelength. For UHF satellite systems, the required path differential accuracy is preferably about ten (10) centimeters. For L and S band mobile satellite constellations, the accuracy must be on the order of one (1) centimeter. Unfortunately, the conventional or GPS techniques are not able to provide the required accuracy.

In accordance with the present invention, the required accuracy of the equivalent path differentials, including all propagation distortion, can be provided using two-way active calibration and R2N (two-way ranging navigation) techniques. An R2N technique is just one technique for obtaining positioning information by which to locate the positioning of the satellites and users precisely using multiple calibration sites and is described in co-pending U.S. patent application Ser. No. 09/209,062, entitled "Method and System for Determining a Position of a Transceiver Unit Incorporating Two-Way Ranging Navigation as a Calibration Reference for GPS," and filed on Dec. 10, 1998. Other known techniques may also be utilized.

The ground telecommunications hub 12 has a processing center 26 that processes each signal and is shown in a transmit mode in FIG. 2. The hub 12 has the capability to address the plurality of satellites 16 individually through the use of antenna spatial discrimination to provide separate signals to different satellites. Alternatively, code identification can also be used to address different satellites independently.

As shown in FIG. 2, assuming that there are "H" users, the signals from user 1 to user H, identified generally by reference number 28, are input into the processing center 26. The position of the various users (1 to H), are determined generally by the circuitry from the various user signals 28, designated by reference number 30. The various user signals 28 for user 1 to user H are then combined for transmission to the different satellites 16, as generally indicated by reference number 32. In this case, the signal is sent to N satellites. The combined signals are then amplified, filtered, up converted, and then further amplified, as generally indicated by reference number 36. These signals are then delivered to a multiple beam antenna 38 where beamforming processing is done so that the signals can be transmitted to the N satellites via radiating signals 24. The beam-forming process can be done in baseband or a low IF frequency band by either digital or analog means. For a low bandwidth (less than a few MHz signals), digital implementation can provide cost advantages. The processed signal 24, radiated from the ground hub 12 to each satellite, is amplified, filtered, and then re-radiated by each of the multiple satellites 16 to arrive at a designated user location simultaneously. Consequently, the radiated signals from the multiple satellites will be received coherently by a simple hand held terminal 22.

Equivalently, the effect of the spatial processing performed by the processing center 26 is to focus signal strength on the user from multiple satellites 16, which act like sparsely separated portions of a large active reflector. Therefore, the processing on the ground will insert different time delays into the signals 24 which are radiated via various paths. The time delays will be inserted into the signals 24 as if the satellites were located on an ellipsoidal surface, of which the two foci are located exactly at the hub 12 and the designated user 18 positions respectively. In low and middle earth orbit constellations, the users 18 and the hub 12 will always be in the near field of the sparse array.

Figure 3:
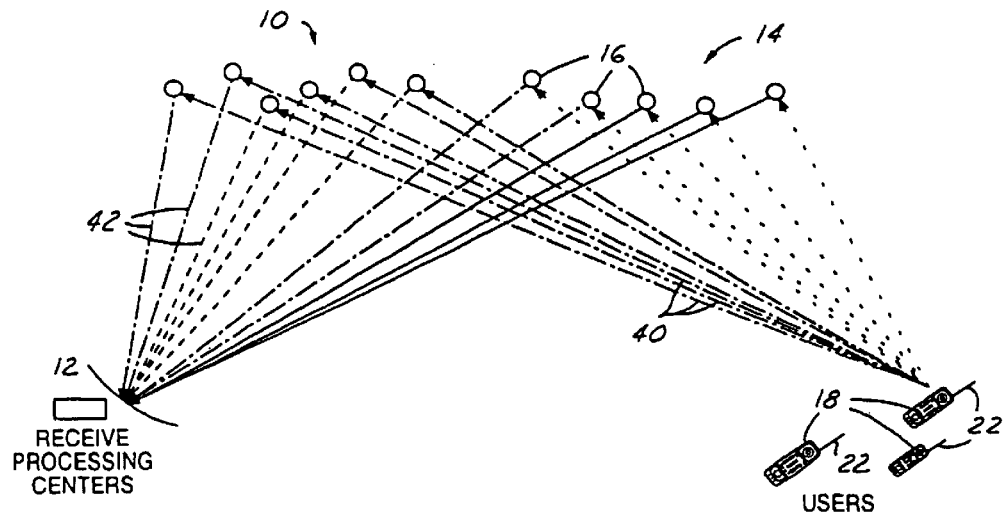
FIG. 3 is a schematic illustration of the return link geometry of a wireless communications system in accordance with a preferred embodiment of the present invention.

In a receive mode, shown in FIG. 3, the individual satellites 16 collect RF signals from the same FOV. FIG. 3 illustrates the return link geometry for receiving signals sent from the user terminals 18 to the ground telecommunications hub 12. As shown in FIG. 3, there are two groups of links involved: the links between users 18 and the satellites 16, generally indicated by reference number 40, and those between the satellites 16 and the hub 12, as generally indicated by reference number 42. For best performance, the user antennas 22 preferably are able to illuminate all the satellites 16 involved. This will lead to a constraint on the variation of the gain of the user antenna 22 over the cluster.

As with the forward link geometry, the satellites 16 will amplify the signals 40 received from the users 18 and re-radiate the signals 42 toward the hub 12. The hub 12 can receive signals 42 independently, but simultaneously from the satellites 16, and will add the signals 42 from different satellites coherently in the post-processor 44 as illustrated in FIG. 4.

Figure 4:
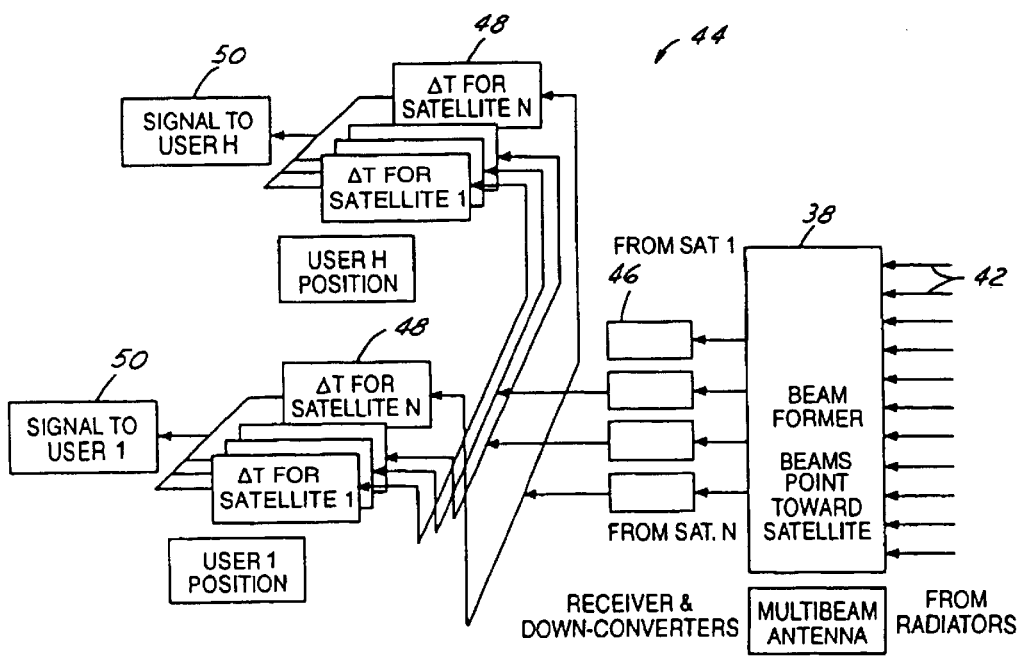
FIG. 4 is a schematic block diagram illustrating the signal receive function of a ground telecommunications hub for a wireless communications system in accordance with a preferred embodiment of the present invention.

The signal flows on the block diagram shown in FIG. 4 illustrate the receive function of the post-processor 40 and the hub 12. The signal flows are reversed from the corresponding ones in FIG. 2. Therefore the receive process will not be reiterated in detail. However, the links 42 from the satellites 16 to the hub 12 are received at the beamformer 38 and then transferred to the receiver and down converters 46 before the signals are separated. The signals are separated depending upon the user from which they are received, as generally indicated by reference number 48, and then sent to the specific user 1 through H, as generally indicated by reference number 50. It should be understood that both the receive and transmit function are a necessary part of the pathlink calibration and user positioning.

The technique of the present invention has been demonstrated to significantly reduce the average side lobe levels. It has been determined that this is due to three factors. First, the proposed architecture is not a periodic array, but rather a randomly spaced sparse array, which has no grating lobes. Although the average side lobe level at a single frequency is relatively high, the level decreases with increasing bandwidth. Second, the large sparsely filled array formed by moving satellites is a large extended aperture size. Thus, all of the users on the ground are in the near field of the extended aperture and the wave fronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a large frequency bandwidth spectrum. The information signal will therefore be spread over this bandwidth via CDMA or through short duration waveforms for TDMA schemes.

Figure 5:
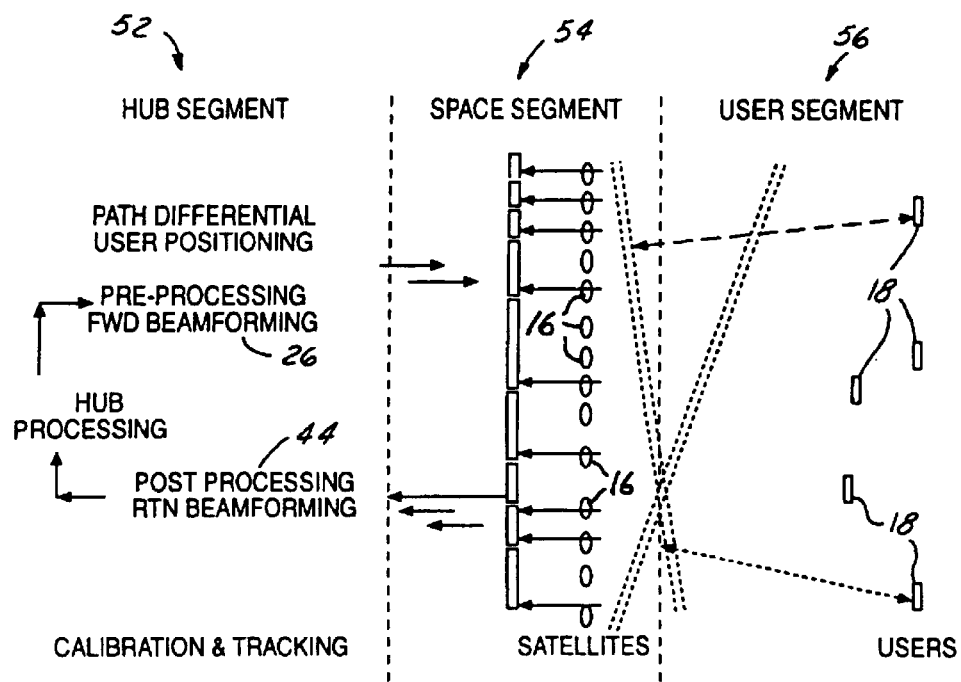
FIG. 5 is a schematic flow diagram illustrating the overall architecture for a wireless communications system in accordance with a preferred embodiment of the present invention.

FIG. 5 illustrates diagrammatically the operation of the invention, which allows for the increased re-use of precious frequency spectrum by multiple satellites. The advantages provided by this system include no limitation on frequency re-use by additional satellites for point-to-point communications. Rather, the capacity of this system is only limited by total satellite RF power. Further, the preferred embodiment allows for the use of simple and low cost satellite designs, because the more satellites included in the constellation, the better the performance of the overall system. The system also provides high system reliability through graceful degradation, as well as concentrating complex processing at the hubs.

The preferred embodiment creates demand for a large number of low cost satellites and also uses R2N techniques to perform satellite and user positioning. The more users using this system, the more accurately the satellite and user positions can be determined. However, even more important than the actual positions of the users and satellites are the path lengths traversed by the signals. Therefore, periodic calibration techniques applied directly to those path lengths may be much simpler and more cost effective. Further, the system also benefits from large percentage bandwidths available with CDMA and TDMA systems.

As shown in FIG. 5, the present invention is divided up into three segments: a hub segment 52 containing the ground telecommunications hub 12, a space segment 54 containing a plurality of individual satellites 16, and a user segment 56, having a plurality of user terminals 18. The hub segment also has a processing center 26 and a post-processor 44 for processing the received and transmitted signals.

The user terminals 18 receive and transmit signals simultaneously from/to multiple satellites 16 via their broad beam antennas. The user terminals 18 do not require any capability to separately address the individual satellites 16 of the space segment 54. The hub 12 maintains links with each of the satellites 16 in the space segment 54 individually and simultaneously. The hub 12 pre-processes the signals intended for each remote user on transmission and post-processes the signals supplied to each local user on reception to compensate for path differentials. These corrections are separately computed and applied to the signals transmitted to or received from each satellite 16 of the space segment 54 for each user.

Figure 6:
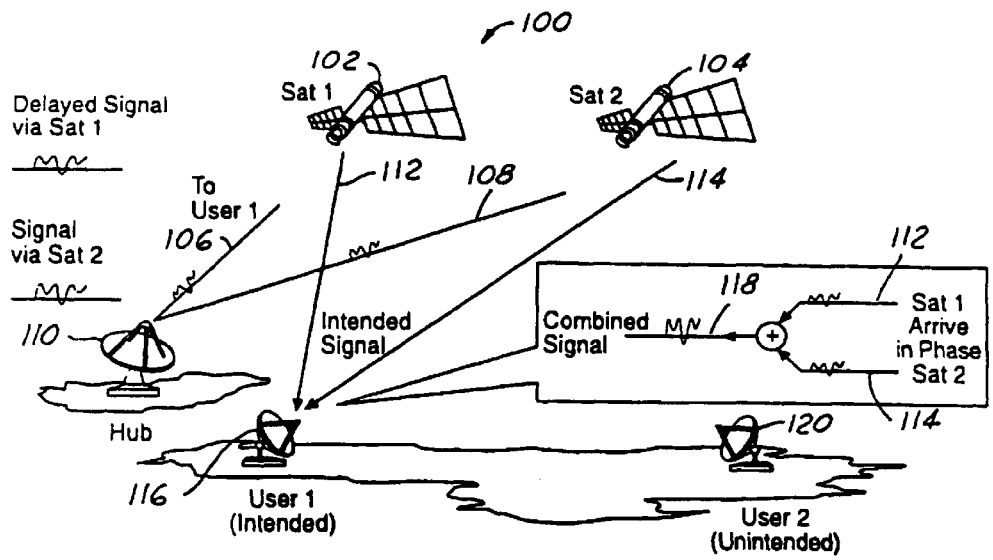
FIG. 6 is a schematic illustration of a multi-transponder wireless communication system illustrating signals being received coherently by their intended remote user.

FIG. 6 illustrates a multi-platform communication system 100 with improved frequency reuse efficiency in accordance with a preferred embodiment of the present invention. In particular, the system illustrated in FIG. 6 uses CDMA coding to subdivide the frequency resource among the various users. The system 100 enables a plurality of transponders 102, 104 to receive signals 106, 108 from the ground hub 110 and to transmit the signals 112, 114 at the same frequency with reduced interference to the intended user 116 from signals intended for other users. This is achieved by synchronizing the transmitted signals at the hub in such a way that the intended user 116 will receive all of the signals 112, 114 synchronously and completely in phase.

Based on the distances from the hub 110, to the various transponders 102, 104 and the distances between the transponders 102, 104 and the intended user 116, the appropriate compensating time delays are calculated and injected into each forward link message at the hub such that the intended user will coherently receive a combined signal from all the transponders as generally indicated at 118. The forward link to the intended user 116 follows the sequence of the hub 110 to the first transponder 102 to the user 116 (hub→trans 1→user 1) and also from the hub 110 to the second transponder 104 to the user 116 (hub→trans 2→user 1). Using the correct time delay on each forward link, all intended signals 112, 114 will arrive at the intended user 116 in phase. Conversely, the same signals intended for the intended user 116 will arrive out of phase at a non-intended user 120 and all other non-intended users in the area. This is shown in FIG. 7, which is described below.

Figure 7:
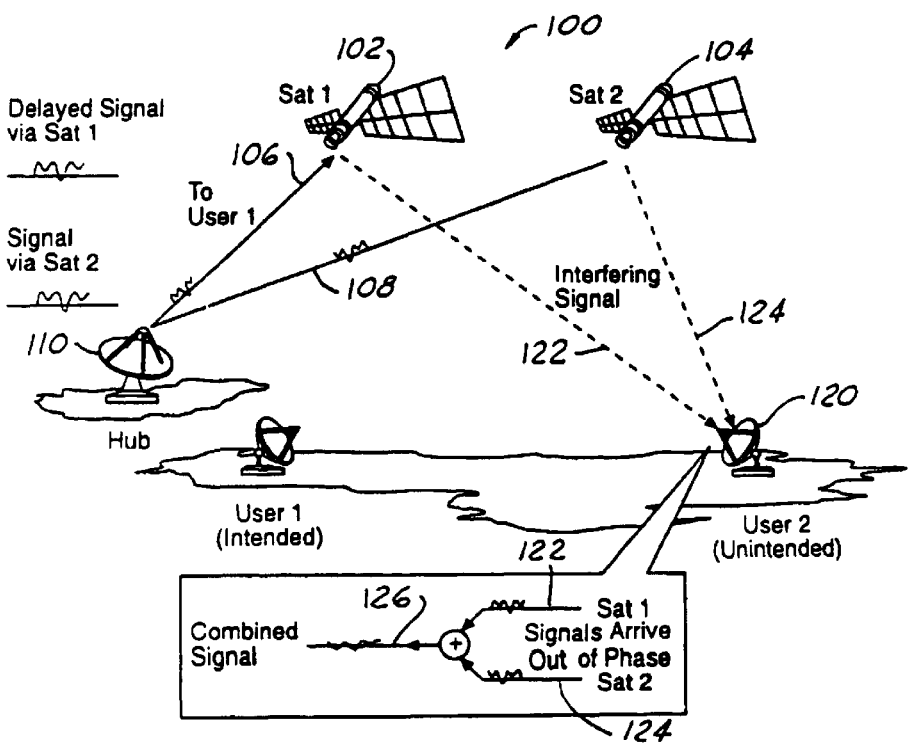
FIG. 7 is a schematic illustration of the multi-transponder wireless communication system of FIG. 6 illustrating the same signals being received incoherently by a remote non-intended user.

FIG. 7, illustrates the operation of the system of FIG. 6 with respect to the non-intended user 120. The distance between the hub 116 and the first transponder 102 and the distance between the first transponder 102 and the non-intended user 120 (hub→trans 1→user 2) and the distance between the hub 116 and the second transponder 104 and the distance between the second transponder 104 and the non-intended user 120 (hub→trans 2→user 2) are different in this case, even after compensation by the hub. Because of the distance differences, the signals 122, 124 will arrive at the non-intended user 120 at a different times and out-of-phase. The combined signal 126 will thus appear as noise and can be rejected as such by the terminal of the non-intended user 120.

It should be understood that the transponders 102, 104 can be part of any type of wireless communication system or can even be selected from several such systems. For example, while a space based system using satellites is illustrated, regional and national tower-based cellular networks for fixed and mobile communications may also be utilized. Additionally, any high altitude platform system, such as manned/unmanned airships, balloons, or airplanes may also be utilized. Further, while only two transponders are illustrated, an unlimited number of transponders may be utilized. Moreover, while the multiple transponders are shown as being part of a unitary system, any combination of transponders can be used to transmit signals in accordance with the present invention. For example, a signal may be transmitted to a user through both a space-based system and a high altitude platform system. Finally, different sets of transponders may be used to communicate with different users. These various sets may overlap in whole, in part or not at all.

Figure 8:
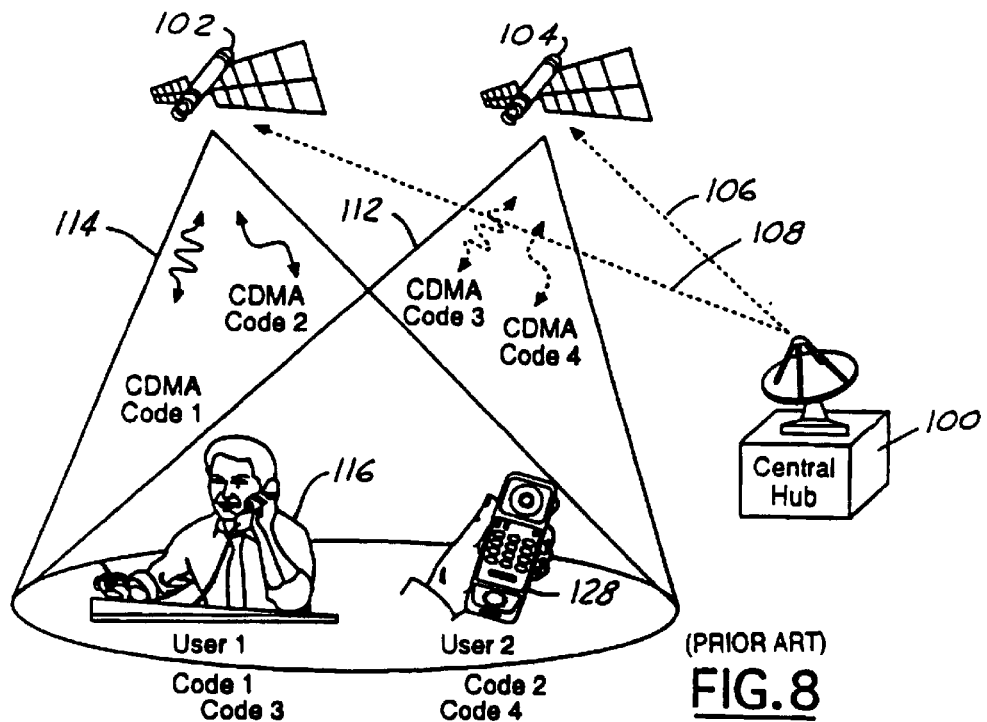
FIG. 8 is a schematic illustration of a conventional approach to an asynchronous CDMA system that may be utilized in accordance with the present invention.

As is known, in conventional CDMA single transponder systems, unique CDMA codes are assigned to each user to avoid interference. Similarly, in multi-transponder systems, when two or more transponders are serving the same geographical location, unique CDMA codes must be used to distinguish the various signals and to avoid interference. For example, as shown in FIG. 8, which illustrates a conventional CDMA multi-transponder system, user 116 must use different codes for signals 112, 114 received from the two different transponders 102, 104. Thus, two distinct codes, "code 1" and "code 3" are assigned to the same user 116 in this example, with "code 1" being assigned to signal 112 and "code 3" being assigned to signal 114. If both transponders 102, 104 were to transmit at "code 1", the two received signals 112, 114 would interfere with each other and the terminal of the user 116 would not be able to decode the signals correctly. Two additional codes must be assigned to each additional user, such as user 128 who is assigned codes 2 and 4.

The various CDMA codes for co-located users can be synchronous or asynchronous. A synchronous orthogonal code gives an advantage of about 15 dB or better over asynchronous CDMA codes. For multiple platforms, it is hard to synchronize CDMA codes among users. Thus, for the disclosed multi-platform system, asynchronous CDMA communication is assumed. Although multiple transponder nodes increase the system availability and total power resource, it under-utilizes the system's full potential, because there are only a finite number of codes available due to the finite bandwidth available to a system. Thus, the total bandwidth limits the number of users the system can serve and the system is unable to fully utilize the power and capacity it was designed to handle.

Figure 9:
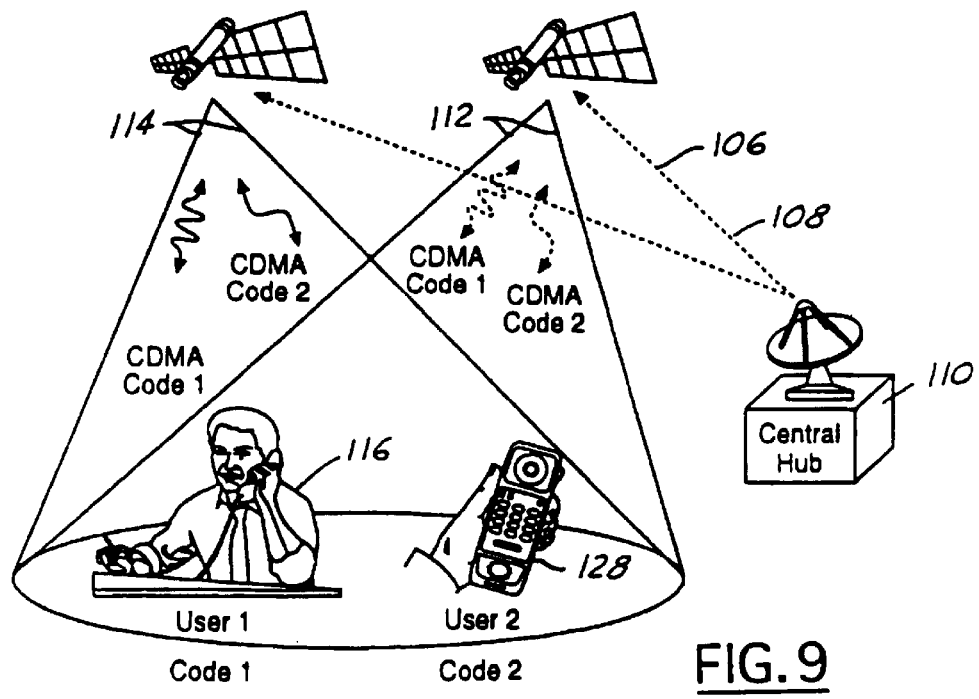
FIG. 9 illustrates a preferred embodiment of the present invention applied to the asynchronous CDMA system of FIG. 8.

In the preferred embodiment, the system 100 is an asynchronous CDMA system that utilizes imbedded time delays as described in co-pending patent application Ser. No. 09/550,505 now U.S. Pat. No. 6,963,548, filed Apr. 17, 2000 and entitled "Coherent Synchronization of Code Division Multiple Access Signals," which is hereby incorporated by reference. In accordance with the preferred system, the signals 112, 114 from each transponder 102, 104 will arrive completely in-phase because appropriate time delays are pre-determined and applied to the signals 112, 114 at the central hub 100, as is shown in FIG. 9. It should be understood that other time delay methods can also be utilized.

As shown, the first user 116 receives signals 112 from each of the transponders 102, 104 using the same code ("code 1"). Similarly, the second user 128 receives signals 114 from each of the transponders 102, 104 using the same code ("code 2"). The central hub 110 determines the time delay between the users and the hub for signals transmitted or received via each transponder and inserts appropriate delays to equalize the total delay via each transponder. Thus, the intended signals from different transponders will all arrive at the intended user in-phase, while non-intended signals will arrive out of phase.

Figure 10:
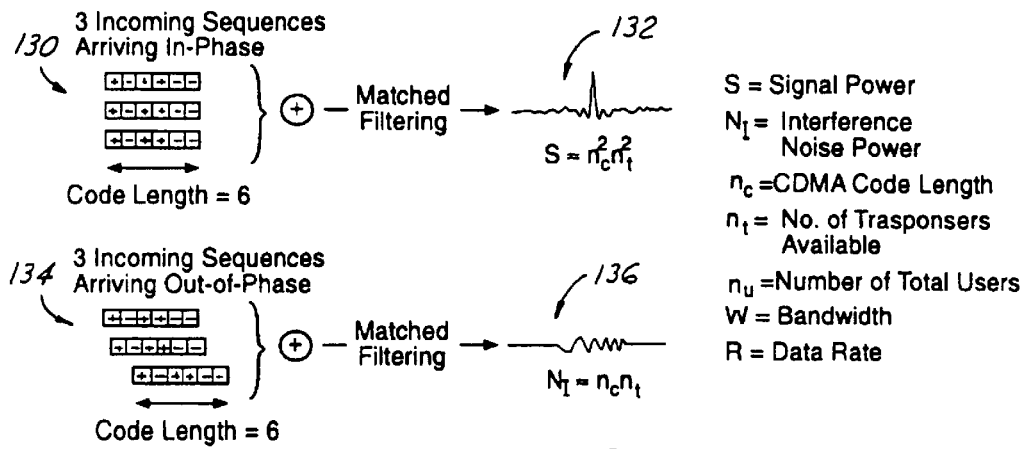
FIG. 10 is a schematic diagram illustrating the reception of matched filtered signals arriving from multiple transponder nodes in accordance with the preferred CDMA system of FIG. 9.

FIG. 10 illustrates the summation and matched-filtering of signals at a user's terminal in accordance with the present invention. The CDMA matched-filtering of the total signal received from all the transponders at the terminal produces greater signal strength when there are multiple satellites. As discussed above, CDMA signals that are not intended for the user will appear as noise and can be suppressed. Thus, the same CDMA code can be reused under certain restrictions.

Referring to FIG. 10, reference number 130 generally indicates three incoming sequences of information that are arriving in-phase. Each of the signals in this example has a code length of six and the signals are match-filtered to form a signal which is generally represented by 132 and the signal strength out of the matched filter is determined according to the equation $$S \approx n_c^2 n_t^2$$

The reference number 134 generally indicates three incoming sequences that are arriving out-of-phase. In this example, each of the signals has a code length of six; the signals are match-filtered and appear as noise as generally represented by 136. The interference or nose power is expressed according to the equation $$N_I \approx n_c n_t$$

It has been determined that the signal-to-noise ratio for a typical user is governed by the following equation:

$$\left(\frac{S}{N_I}\right)_{CT} \approx \frac{n_c n_t}{n_u - 1} \qquad \text{Equation 1}$$

where S=Signal Power;

$N_I$=Interference Noise Power;

$n_c$=CDMA Code Length;

$n_t$=No. of Transponders; and $n_u$=No. of Total Users.

It has further been determined that as long as the users are sufficiently far separated, the same CDMA code can be re-used without significantly degrading the signal-to-noise ratio. The system capacity of the disclosed system is thus proportional to $n_c$ and $n_t$.

In accordance with a preferred embodiment of the present invention, a novel resource allocation technique for the multi-platform communication system 10 is disclosed. As discussed below, the system 10 consists of a plurality of transponding platforms or nodes, examples of which are set forth above, that work coherently and cooperatively to achieve total system capacity that is proportional to the number of platforms ($n_t$) and the number of code choices ($n_c$), which is related to the total communication bandwidth.

As is known, the key resources of any communication system are power and bandwidth. In the case of a system employing CDMA, the bandwidth resource is related to the number of available codes. Alternatively, for a system employing TDMA, time slots play an analogous role. Conventional systems are typically either power limited or bandwidth limited, but seldom both. The resource allocation is usually based on dynamic allocation of power (for a power limited system) or bandwidth (for a bandwidth limited system). In accordance with the disclosed system, the bandwidth resource will be referred to herein as the system resource which may include code or time in cases of multiple access applications.

The preferred system 10 utilizes a resource allocation technique with three dimensions: bandwidth, the number of platforms, and the power available per platform. Accordingly, a technique is disclosed that utilizes Linear Programming or other similar resource allocation concepts to dynamically optimize the usage of the system resources during operation and maximize the total monetary return per capital.

The following parameters are relevant to the resource allocation system 10 of the preferred embodiment:

B Total effective bandwidth including reuse.

$b_i$ Bandwidth used by user i.

$n_t$ Number of platforms in the system.

$n_u$ Number of users served by the system.

$N_u$ Number of users requesting to be served by the system.

$p_{ij}$ Power provided by platform j for user i.

$P_j$ Power available at platform j for all users.

$q_i$ Power required by user i to close the communication link.

$x_i$ Profit (revenue minus cost) rate when user i is served.

x Total profit rate of the system.

$\delta_i$ 1 if user i is served by the system; 0 otherwise.

$\delta_{ij}$ 1 if user i is served by platform j; 0 otherwise.

The total number of users served by the system at any arbitrary moment can be determined as follows:

$$n_u = \sum_{i=1}^{Nu} \delta_i$$

With a system having bandwidth limitations, the system resources are typically allocated in accordance with the following equation:

$$\sum_{i=1}^{Nu} \delta_i b_i \leq B$$

Conversely, with a system having power limitations, the system resources are typically allocated in accordance with the following equations:

$$\sum_{i=1}^{Nu} \delta_i P_{ij} \leq P_j$$

$$\sum_{j=1}^{n_t} \delta_{ij} P_{ij} = q_i$$

With both these systems the resources are allocated with the intention of maximizing the number of users served by the system ($n_u$).

In accordance with the preferred resource allocation method, the platform space is an independent dimension. Therefore, the platform power resource can be calculated as follows:

$$\sum_{i=1}^{Nu} \delta_{ij} P_{ij} \leq P_j$$

$$\sum_{j=1}^{N_t} \delta_{ij} P_{ij} = q_i$$

The usage indicator $\delta_{ij}$ is used to describe this new degree of freedom and is mathematically related to the old usage indicator as follows:

$$\delta_i = \underset{j=1}{\overset{n_t}{OR}}\, \delta_{ij}$$

In accordance with the preferred embodiment, a profit value is defined based on the user type. The profit value can depend on factors such as revenue or other monetary amounts. Additionally, the profit value can depend upon a variety of other factors or criteria stored in the central hub and associated with each of the different user types. These factors or criteria allow the system to distribute or allocate resources between the various different types of users.

For example, users that request different levels of service may be treated differently. If a user is paying a premium for guaranteed service, the system will assign that user a profit value such that the system will allocate resources preferentially to that user over another user who is only paying for service on a conditional basis. Further, the user types can also be distinguished depending upon the features they choose, such as voice or data.

The disclosed method preferably optimizes the profit value, which is also referred to as the utility value. The total profit/utility value of the disclosed system is calculated according to the following equation:

$$x = \sum_{i=1}^{N_u} \delta_i x_i$$

For the disclosed multi-platform system, the total profit/utility of the system (x) is preferably maximized in accordance with the following constraints jointly and dynamically:

$$\sum_{i=1}^{u} \delta_{ij} P_{ij} \leq P_j$$

$$\delta_i = \underset{j=1}{\overset{n_t}{OR}} \delta_{ij}$$

$$\sum_{i=1}^{Nu} \delta_i b_i \leq B$$

It is assumed that the same bandwidth or code space is used by all platforms to provide service to any user. In the preferred embodiment, a CDMA system is utilized, such as discussed above. Other systems such as FDMA/TDMA systems can also be utilized, however the bandwidth resource allocation can be more complicated. The disclosed resource allocation technique provides better utilization of resources, allows flexible response to market demand changes and maximizes the total profit return.

Figure 11:
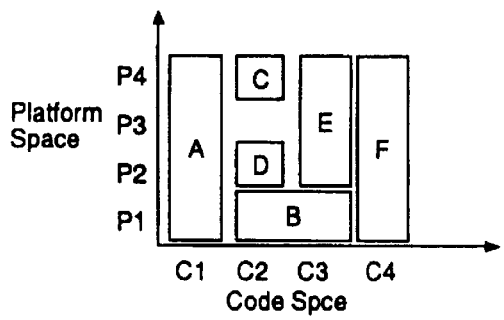
FIG. 11 is a schematic diagram illustrating an exemplary distribution of users in platform-code space for a multiple platform system in accordance with a preferred embodiment of the present invention.

In order to describe the operation of the disclosed resource allocation technique, an exemplary multi-platform system consisting of four platforms ($P_1, P_2, P_3, P_4$) and four codes ($C_1, C_2, C_3, C_4$) is disclosed and shown in FIG. 11. As shown in FIG. 11, which is merely for illustration purposes, the disclosed system 10 is not limited by either the size of the platform space or the size of the code space above. The diagram includes a plurality of individual resource cells, with each individual resource cell being associated with a particular platform and a particular code. The number of individual resource cells is equal to the number of platforms multiplied by the number of codes.

Thus, in FIG. 11, sixteen individual resource cells exist with the first cell being located in the diagram at the coordinate position identified by ($P_1, C_1$) and the last cell being located in the diagram at the coordinate position identified by the ($P_4, C_4$). The identification of the other cells will be known and understood by those of skill in the art.

Having now fully described the invention, it will be apparent to one of ordinary skill in the art that many changes and modifications can be made thereto without departing from the spirit or scope of the invention as set forth herein.

What is claimed is:

1. A method for allocating system resources in a multi-platform communication system, comprising:
   providing a plurality of individual transponding nodes;
   processing a plurality of local user signals at a ground hub to compensate for differential propagation delays to any one of a plurality of remote users;
   assigning each of said plurality of remote users a profit value, which is dependent upon certain predetermined user criteria;
   assigning each of said plurality of remote users one or more resource cells in platform-code space depending upon service requirements of each of said plurality of remote users, at least one of said users assigned a same platform code in more than one node;
   wherein each resource cell assigned to a particular user enables the particular user to transmit signals to or from the hub through a particular one of said transponding nodes and using a particular code.

2. The method of claim 1, wherein each of said plurality of individual transponding nodes is independently selected from one of the following system types: a space-based system, a high altitude platform system, or a tower based cellular network.

3. The method of claim 2, wherein said high altitude platform system is comprised of a plurality of manned/unmanned airships.

4. The method of claim 2, wherein said high altitude platform system is comprised of a plurality of high altitude balloons.

5. The method of claim 1, wherein said system utilizes a TDMA technique.

6. The method of claim 1, wherein said system utilizes a FDMA technique.

7. The method of claim 1, further comprising:
   determining a total profit/utility value for the system based partly on said assigned user utility value.

8. The method of claim 7 wherein said total profit/utility value is maximized according to the following constraints:

$$\sum_{i=1}^{Nu} \delta_{ij} P_{ij} \leq P_j$$

$$\delta_i = \underset{j=1}{\overset{n_t}{OR}} \delta_{ij}$$

$$\sum_{i=1}^{Nu} \delta_i b_i \leq B.$$

9. A mobile wireless communication system for a variety of different mobile user types, comprising:
   a plurality of individual transponding nodes;
   a plurality of individual resource cells each associated with a particular one of said plurality of individual transponding nodes and a particular one of a plurality of available codes wherein more than one of the plurality of available codes are shared over more than one node;
   a plurality of mobile terminals, each of which is assigned to operate in one or more of said plurality of individual resource cells;
   a profit value assigned to each of said plurality of mobile terminals; and
   a central hub for establishing links with one or more of said plurality of mobile terminals and for assigning one or more of said resource cells to each of said plurality of mobile terminals and for assigning said profit value to each of said plurality of mobile terminals, said central hub assigning one or more of said resource cells in response to said profit value.

10. The system of claim 9, wherein said central hub establishes links to said users through one or more of said plurality of transponding nodes wherein the specific transponding node and code used to complete each of said links are determined by said resource cells assigned to said user.

11. The system of claim 9, wherein said central hub pre-processes signals for forward link transmission such that the signals are radiated with compensating time delays to an intended one of said plurality of mobile users such that all the signals intended for the intended one of said plurality of mobile users are coherently received by the intended one of said plurality of mobile users; and
   wherein said central hub post-processes received signals to introduce compensating time delays such that all such signals received from a particular remote user may be coherently processed together.

12. The system of claim 9, wherein each of said plurality of individual transponding nodes is independently selected from one of the following system types: a space-based system, a high altitude platform system, or a tower based cellular network.

13. The system of claim 12, wherein said high altitude platform system is comprised of a plurality of manned/unmanned airships.

14. The system of claim 12, wherein said high altitude platform system is comprised of a plurality of high altitude balloons.

15. The system of claim 9, wherein the system profitability is maximized by giving system priority to users having a preselected profit value.

16. The system of claim 9, wherein power to a particular one of said plurality of mobile terminals is increased by increasing the number of resource cells assigned to said particular user and/or by increasing the number of said plurality of platforms assigned to said particular user.

17. The system of claim 11, wherein at least one of said plurality of mobile terminals is assigned resource cells in platform-code space for said return link that are different from said resource cells in platform-code space assigned for said forward link.

18. A method for allocating system resources in a multi-platform communication system, comprising:
    providing a plurality of mobile users;
    establishing a link between each of said plurality of mobile users and a ground hub through one or more of a plurality of transponding nodes;
    processing a plurality of local user signals at said ground hub;
    assigning each of said plurality of mobile users an individual profit value indicative of a particular type of service requested by said mobile user; and
    transmitting signals to or from said ground hub through one or more of said transponding nodes and one or more resource cells that have the same code in more than one of said transponder nodes destined for the same user.

19. The method of claim 18, wherein each of said plurality of transponding nodes is independently selected from one of the following platform system types: a space-based system, a high altitude platform system, or a tower-based cellular network.

20. The method of claim 18, further comprising:
    assigning each of said plurality of mobile users one or more of said resource cells, which are each associated with a particular one of said plurality of transponding modes and a particular one of a plurality of available codes.

21. The method of claim 18, further comprising:
    determining a total profit/utility value for the system based partly on said assigned mobile user profit value.

22. A method for allocating system resources in a multi-platform communication system, comprising:
    providing a plurality of individual transponding nodes;
    processing a plurality of local user signals at a ground hub to compensate for differential propagation delays to any one of a plurality of remote users;
    assigning each of said plurality of remote users a profit value, which is dependent upon certain predetermined user criteria;
    assigning each of said plurality of remote users one or more resource cells in platform-code space depending upon service requirements of each of said plurality of remote users;
    wherein each resource cell assigned to a particular user enables the particular user to transmit signals to or from the hub through a particular one of said transponder nodes and using a particular code; and
    wherein said system utilizes a FDMA technique and said total profit/utility value is maximized according to the following constraints:

$$\sum_{i=1}^{Nu} \delta_{ij} P_{ij} \le P_j$$

$$\delta_i = \underset{j=1}{\overset{n_t}{OR}} \delta_{ij}$$

$$\sum_{i=1}^{Nu} \delta_i b_i \le B.$$

23. A method for allocating system resources in a multi-platform communication system, comprising:
    providing a plurality of individual transponding nodes;
    processing a plurality of local user signals at a ground hub to compensate for differential propagation delays to any one of a plurality of remote users;
    assigning each of said plurality of remote users a profit value, which is dependent upon certain predetermined user criteria;
    assigning each of said plurality of remote users one or more resource cells in platform-code space depending upon service requirements of each of said plurality of remote users;
    wherein each resource cell assigned to a particular user enables the particular user to transmit signals to or from the hub through a particular one of said transponder nodes and using a particular code; and
    wherein said system utilizes a TDMA technique and said total profit/utility value is maximized according to the following constraints:

$$\sum_{i=1}^{Nu} \delta_{ij} P_{ij} \le P_j$$

$$\delta_i = \underset{j=1}{\overset{n_t}{OR}} \delta_{ij}$$

$$\sum_{i=1}^{Nu} \delta_i b_i \le B.$$

24. A wireless communication system for a plurality of mobile terminals, comprising:
    a plurality of individual transponding nodes;
    a plurality of individual resource cells each associated with a particular one of said plurality of individual transponding nodes and a particular one of a plurality of available codes wherein more than one of the plurality of available codes are shared over more than one node; and
    a central hub for establishing links with one or more of said plurality of mobile terminals and for assigning one or more of said plurality of individual resource cells to each of said plurality of mobile terminals in accordance with a profit value assigned to each of said plurality of mobile terminals.

25. The system of claim 24, wherein said central hub pre-processes signals for forward link transmission such that the signals are radiated with compensating time delays to an intended one of said plurality of mobile terminals such that all the signals intended for the intended one of said plurality of mobile terminals are coherently received by the intended one of said plurality of mobile terminals; and wherein said central hub post-processes received signals to introduce compensating time delays such that signals received from a particular remote user may be coherently processed together.

26. The system of claim 24 whrein a total number of said plurality of individual resource cells is equal to a total number of said plurality of individual transponding nodes multiplied by a total number of said plurality of available codes.

27. A wireless communication system for a plurality of mobile user terminals, comprising:

a plurality of individual transponding nodes;

a pluarlity of individual resource cels each associated with a particular one of said plurality of individual transponding nodes and a particular one of a plurality of available system resources, wherein more than one of the plurality of available system resources are shared over more than one node; and a central hub for establishing links with one or more of said plurality of mobile user termnals and for assigning one or more of said plurality of individual resource cells to each of said plurality of mobile user terminals, and wherein each of said plurality of mobile user terminals is assigned to operate in one or more of said plurality of individual resource cells.

28. The system of claim 27, whrein said central hub pre-processes signals for forward link transmission such that the signals are radiated with compensating time delays via at least two of the plurality of individual transponding nodes to an intended one of said plurality of mobile user terminals such that all the signals intended for the intended one of said plurality of mobile user terminals are coherently received by the intended one of said plurality of mobile user.

29. The system of claim 27 wherein a total number of said plurality of individual resource cells is equal to a total number of said plurality of individual transponding nodes multiplied by a total number of said plurality of available system resources.

30. The system of claim 27, wherein said plurality of available system resources comprises a plurality of codes.

31. The system of claim 27, wherein said plurality of available system resources comprises a plurality of time slots.

32. The system of claim 27, wherein said plurality of available system resources comprises a plurality of frequency slots.

33. The system of claim 27, wherein bandwidth is limited.

34. The system of claim 27, wherein power is limited.

35. The system of claim 27, wherein said central hub assigns one or more of said plurality of individual resource cells to each of said plurality of mobile user terminals in accordance with a respective assigned profit value associated with said mobile user terminal.

36. A method for allocating system resources to a plurality of mobile users in a multi-platform communication system, comprising:

establishing a link between each of said plurality of mobile users and a ground hub through one or more of a plurality of transponding nodes;

processing a plurality of local user signals at said ground hub;

assigning each of said plurality of mobile users an individual profit value indicative of a particular type of service requested by said mobile user; and transmitting signals to or form said ground hub through one or more of said transponding nodes and one or more resource cells that have a same system resource in more than one of said transponding nodes destined for a same mobile user.

37. The method of claim 36, wherein the one or more resource cells are allocated for transmitting based on the assigned individual profit value.

38. The method of claim 36, wherein the same system resource comprises code.

39. The method of claim 36, wherein the same system resource comprises time slots.

40. The method of claim 36, further comprising, prior to the step of assigning, determining the individual profit value using a plurality of criteria.

41. The method of claim 40, further comprising storing the plurality of cirteria in the ground hub for use in the step of determining.

42. The method of claim 36, further comprising processing the signals before transmitting such that all the signals intended for the same user are coherently received by the same mobile user.

43. The method of claim 36, wherein a total profit/utility value is maximized according to the following constraints:

$$\sum_{i=1}^{Nu} \delta_{ij} P_{ij} \le P_j$$

$$\delta_i = \underset{j=1}{\overset{n_t}{OR}} \delta_{ij}$$

$$\sum_{i=1}^{Nu} \delta_i b_i \le B.$$

* * * * *